Dec. 23, 1924.  
E. ARNSDORF  
1,520,665  
SIGNALING DEVICE FOR COLLAPSING PNEUMATIC TIRES  
Filed Nov. 13, 1922

Witnesses:
Richard Schultz.
Margarete Breitmann.

Inventor:
Ernst Arnsdorf
by: Attorney

Patented Dec. 23, 1924.

1,520,665

UNITED STATES PATENT OFFICE.

ERNST ARNSDORF, OF NEUDAMM, GERMANY.

SIGNALING DEVICE FOR COLLAPSING PNEUMATIC TIRES.

Application filed November 13, 1922. Serial No. 600,728.

*To all whom it may concern:*

Be it known that I, ERNST ARNSDORF, a citizen of the German Republic, and a resident of Neudamm, Neumark, Germany, have invented certain new and useful Improvements in Signaling Devices for Collapsing Pneumatic Tires, of which the following is a specification.

My invention relates to an improved signaling device for indicating the escape of air from and the consequent collapse of pneumatic tires of motor cars. For the safety of the occupants of a motor car and in order to avoid serious injury to the pneumatic tires of such cars it is of great importance that an early indication of the collapse or deflation of the tires should be given. If a tire has become too flat the car is liable to skid, and the driver has it no longer well in hand. Experience has shown that a puncture in the tire caused by the penetration of a foreign body into the air-tube grows so quickly, that already after a few revolutions of the wheel the damage is so serious, that it is practically impossible to repair the tire again. In view of the high price of tires this is, of course, a serious loss. Proposals have previously been made to give the driver of the car a signal, if the tire is becoming flat. In most proposals a rod or stem secured upon the wheel is subjected to the action of the air-tube, which in the highly inflated state forces the rod back against the resistance of a spring. If the air escapes from the air-tube the spring will force the rod against the collapsing air-tube and move the rod radially towards the circumference of the wheel and thereby gives a signal or grounds the ignition circuit, so that the motor of the car is stopped automatically. In the known devices the catch which closes the switch is disposed upon the rod or stem. Thereby the reliability of the signaling device is rendered questionable, particularly if the catch has been accidentally bent, for instance during the removal or exchange of a wheel or if the wheel has altered its original position upon the shaft. Such defects can not be examined without trouble and it is necessary that this and the many other examinations should be made at a glance, as neglect would render the whole safety device useless. The constantly laterally projecting catch does not lend itself to a wide range of adjustment and consequently the signal might be given prematurely, particularly if the springs of the car give too much and the clearance between catch and switch is not wide enough.

My invention offers the greatest possible safety against such accidents by the insertion of a further safety element into the devices for operating the signal. According to my invention the rod or stem, which moves towards the circumference of the wheel when the air-tube collapses, does not carry the catch but the catch is an arm hinged near the hub of the wheel and is locked in position by the rod, which only releases it when the tire begins to become deflated, whereupon the catch flies outwardly and sets the signal in operation. The catch reposes in its inoperative position within the periphery of the wheel and does not project, so that it cannot be accidentally bent or otherwise damaged without this becoming visible at once.

Two embodiments of my invention are shown in the accompanying drawing in which—

Similar parts are indicated by the same letters of reference throughout all the figures of the drawing.

Figure 1:
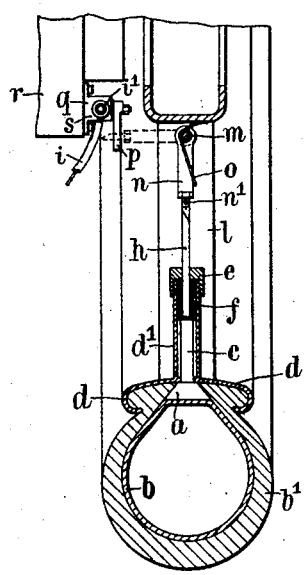
Fig. 1 is a cross-section of the improved device applied to a pneumatic tire with the rim and the part of the wheel necessary for the understanding of the invention.

Referring to Fig. 1 it will be seen that between the beads of the outer cover $b^1$ of the tire wedge-shaped pieces or insertions $a$ are inserted in the usual manner, which are forced against the rim $d$ by the inflated air-tube $b$. Upon one of these wedges $a$ a stem $c$ is attached, which is guided in a tube $d^1$ fixed upon the rim $d$ and passes with a reduced portion $h$ through a screw-cap $e$ closing the tube $d^1$. A helical spring $f$ within the tube $d^1$ acts upon the shoulder of the stem $c$ and tends to force the stem $c$ into the cover $b^1$. The spring $f$ is of such a strength, that its resistance is overcome by the fully inflated air-tube $b$, but assumes the upper-hand as soon as the pressure in the air-tube drops and moves the stem $c$ towards the circumference of the wheel.

The stem $c$ locks a catch $n$ in its inoperative position which catch is fulcrumed at $m$ upon one or two spokes $l$ of the wheel and is acted upon by a spring $o$, which tends to turn it into the operative position, indicated in broken lines in the drawing and in which it is no longer situated in the diametrical plane through the wheel, but at approximately right angles to it. The length of the catch $n$ may be accurately adjusted by means of a pin $n^1$ screwed into it, so that when the pressure falls in the air-tube the stem $c$ follows the collapsing tube and releases the catch $n$. The catch in its released position during the rotation of the wheel, contacts with an arm $p$ of a switch $q$ fixed upon the frame $r$ of the car. The switch closes a circuit which gives a signal at the dashboard $u$ of the car, which may be either visible, such as a lighted incandescent lamp $v$ or audible, such as a ringing bell $w$ (Fig. 2).

Figure 2:
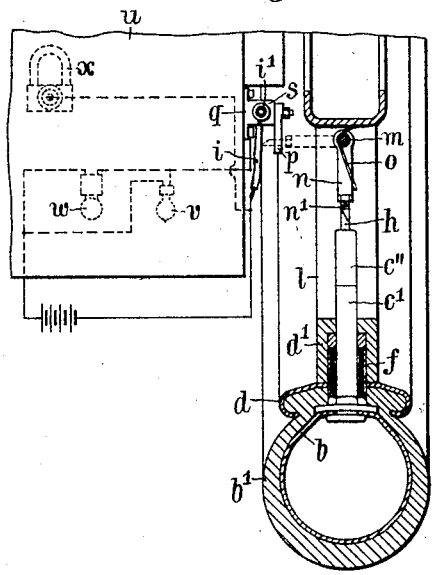
Fig. 2 is a modified construction of the improved device.
Figure 3:
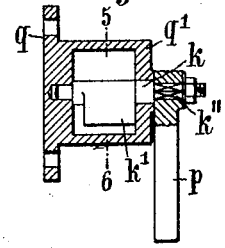
Fig. 3 is a cross-section through the switch.
Figure 4:
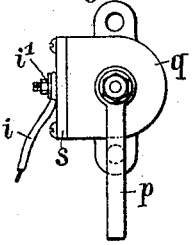
Fig. 4 is a front-elevation of the same.
Figure 5:
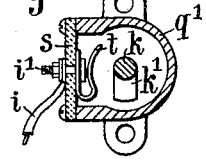
Fig. 5 is a cross-section through the switch along the line 5—6 of Fig. 3.
Figure 6:
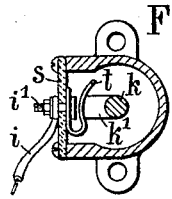
Fig. 6 is a similar cross-section with the parts in a different position.

In the place of the rod or stem $c$, the tubular casing of the valve for the air-tube $b$, as shown in Fig. 2 may be employed. Referring to this figure it will be seen that valve casing $c^1$ connected in the usual manner with the air-tube $b$ is radially guided in the inner wooden rim $d^2$. Around the casing $c^1$ is wound a spring $f^1$, which tends to force the casing away from the rim $d^2$. The screw cap $c''$ of the casing $c^1$ carries a locking-tooth $h^1$ which when the air-tube $b$, is inflated to its full extent maintains the catch $n$ pivoted on the spokes of the wheel in its locked position.

As soon as the air-pressure in the tire drops slightly it is outbalanced by the pressure of the spring and the valve casing $c^1$ moves towards the tire $b^1$. The locking tooth $h^1$ then releases the catch $n$, which swings out sideways and closes the switch $q$.

The switch $q$ comprises a casing $q^1$ fixed upon the frame $r$ of the car. Within the casing $q^1$ is disposed a shaft $k$, which carries a cam $k^1$, the end of the shaft $k$ projecting from the casing is provided with a square portion $k''$ upon which an arm $p$ is fixed. One wall $s$ of the casing is made of insulating materials and carries a contact spring $t$ within the path of the cam $k^1$. The contact spring $t$ is provided with a terminal screw $i^1$ on which a cable $i$ is attached which leads to the ignition apparatus $x$ or the lamp or bell contact near the seat of the driver. The cam has solid contact across the casing $q^1$ with the frame $r$ of the car and is also connected with the motor and the ignition apparatus whereby the latter may be grounded.

It will be understood that the details of the mechanism may be modified in various ways without departing from the spirit of my invention.

Having thus particularly described the nature of my invention, what I claim as new and desire to secure by Letters Patent of the United States is:

In a signaling device for collapsing pneumatic tires, comprising a casing adapted to be secured upon the frame of a vehicle, a switch within said casing, a swinging arm depending from said casing for actuating said switch, a spring returned swinging catch pivoted upon the spokes of the wheel, a member forced radially inward by the air pressure of the tire, and means upon the end of said swinging catch cooperating with means upon the end of said member for locking said swinging catch in inoperative position, whereby upon the reduction of pressure in the tire said member will release said swinging catch to enable the same to engage said swinging arm to close said switch.

In testimony whereof I affix my signature in presence of two witnesses.

ERNST ARNSDORF.

Witnesses:
E. HOLTZERMANN,
R. T. ANSPACH.